US012403060B2

(12) United States Patent
Masia et al.

(10) Patent No.: US 12,403,060 B2
(45) Date of Patent: Sep. 2, 2025

(54) APPARATUS CAPABLE OF ACTUATING A DISTAL JOINT AND TRANSFERRING THE CONSTRAINING REACTIONS IN AN UNDERACTUATED SHOULDER EXOSKELETON

(71) Applicants: Scuola Superiore di Studi Universitari e di Perfezionamento Sant'Anna, Pisa (IT); Universität Heidelberg, Heidelberg (DE)

(72) Inventors: Lorenzo Masia, Heidelberg (DE); Antonio Frisoli, Pisa (IT); Luca Tiseni, Pisa (IT); Domenico Chiaradia, Pisa (IT); Michele Xiloyannis, Zurich (CH); Massimiliano Solazzi, Pisa (IT)

(73) Assignees: Scuola Superiore di Studi Universitari e di Perfezionamento Sant'Anna, Pisa (IT); Universität Heidelberg, Heidelberg (DE)

( * ) Notice: Subject to any disclaimer, the term of this patent is extended or adjusted under 35 U.S.C. 154(b) by 703 days.

(21) Appl. No.: 17/622,400

(22) PCT Filed: Jun. 25, 2020

(86) PCT No.: PCT/IB2020/056009
§ 371 (c)(1),
(2) Date: Dec. 23, 2021

(87) PCT Pub. No.: WO2020/261167
PCT Pub. Date: Dec. 30, 2020

(65) Prior Publication Data

US 2022/0354727 A1 Nov. 10, 2022

(30) Foreign Application Priority Data

Jun. 25, 2019 (IT) ........................ 102019000010026

(51) Int. Cl.
*A61H 1/02* (2006.01)

(52) U.S. Cl.
CPC ...................... *A61H 1/0281* (2013.01); *A61H 2201/1215* (2013.01); *A61H 2201/1616* (2013.01);
(Continued)

(58) Field of Classification Search
CPC ....... B25J 9/0006; B25J 9/003; A61H 1/0281; A61H 2201/1215; A61H 2201/1616; A61H 2201/1638; A61H 2201/1673
See application file for complete search history.

(56) References Cited

U.S. PATENT DOCUMENTS 10,463,560 B2 11/2019 Deshpande et al.
10,821,601 B2 11/2020 Baldoni et al.
(Continued)

FOREIGN PATENT DOCUMENTS

CN 107921628 A 4/2018
CN 109318217 A 2/2019
(Continued)

OTHER PUBLICATIONS

International Search Report for International Patent Application No. PCT/IB2020/056009, mailed Oct. 13, 2020.

*Primary Examiner* — Bruce E Snow
(74) *Attorney, Agent, or Firm* — Armstrong Teasdale LLP

(57) ABSTRACT

An underactuated mechanism has a first rotoidal joint connected to a human torso and rotating about a first joint rotation axis, a hyper-redundant connection mechanism connected to the first rotoidal joint, and a second rotoidal joint rotating about a second joint rotation axis, coplanar with the first joint rotation axis. The second rotoidal joint is remotely actuated by a driven pulley and Bowden cables or by a direct drive actuation system with co-located motor, and is fixed to
(Continued)

the hyper-redundant connection mechanism on one side and to a human arm on the other side. The hyper-redundant connection mechanism has at least three members. Two members of the at least three members are rigidly fixed to one of the rotoidal joints, respectively. All members are connected together by rotation joints with axes parallel to one another and arranged to connect one member to a successive member to form a rotation constraint.

15 Claims, 4 Drawing Sheets

(52) U.S. Cl.
CPC ................ *A61H 2201/1638* (2013.01); *A61H 2201/1673* (2013.01)

(56) References Cited

U.S. PATENT DOCUMENTS

| | | | |
|---|---|---|---|
| 10,843,332 B2 | 11/2020 | Walsh et al. | |
| 11,007,107 B2 | 5/2021 | Zoso et al. | |
| 2010/0217163 A1* | 8/2010 | Sankai | B25J 9/0006 601/5 |
| 2018/0008502 A1 | 1/2018 | Asbeck et al. | |
| 2019/0029914 A1 | 1/2019 | Polygerinos et al. | |
| 2019/0160653 A1 | 5/2019 | Artemiadis et al. | |
| 2020/0315897 A1* | 10/2020 | Kim | A61H 1/0277 |

FOREIGN PATENT DOCUMENTS

| | | |
|---|---|---|
| WO | 2013186705 A2 | 12/2013 |
| WO | 2017093298 A1 | 6/2017 |
| WO | 2018093448 A2 | 5/2018 |

* cited by examiner

APPARATUS CAPABLE OF ACTUATING A DISTAL JOINT AND TRANSFERRING THE CONSTRAINING REACTIONS IN AN UNDERACTUATED SHOULDER EXOSKELETON

CROSS-REFERENCE TO RELATED APPLICATIONS

This application is a National Stage Application of International Patent Application No. PCT/IB2020/056009, having an International Filing Date of Jun. 25, 2020, which claims the benefit of priority to Italian Patent Application No. 102019000010026, filed Jun. 25, 2019, the entire contents of which are hereby incorporated by reference herein.

TECHNICAL FIELD

The present invention relates to the technical field of upper limb exoskeletons for strengthening or for assistance in patients with motor disabilities of the upper limb, in particular to a system adapted to transmit a flexion-extension torque on the shoulder joint.

BACKGROUND ART

The present invention finds application in the field of rehabilitation medicine and human enhancement in the industrial field.

In fact, in the industrial field, in order to reduce and prevent the onset of pathologies of the musculoskeletal system caused by an overload of work duties requiring repetitive tasks with the transport of loads and to reduce muscle fatigue in repetitive tasks, wearable support apparatuses of the exoskeletal type, either of the passive or robotic type, have spread, being capable of transferring the forces required to perform tasks from distal districts of the upper limb to districts of the body, such as the torso or legs, bypassing the transfer of the load onto the lumbar areas.

In the medical rehabilitation field, exoskeletons are instead commonly used for robot-assisted rehabilitation.

In the field of rehabilitation robots and cooperative robots for upper limbs, there is a macro-division between two types of robots, End effector based Robots (EEB Robot) and Exoskeletons.

In EEB robots, the interaction between the robot and the human body occurs only through the end effector, which is in contact with the patient's hand or forearm. The arm can be spatially positioned and/or oriented depending on the degrees of freedom available for the mechanism. Usually, the rotation axes of the robotic system joints do not correspond to those of the human body joints: this explains why EEB robots are easier to design and produce than exoskeletons are. They are also more easily adjustable to different lengths of the patient's arm.

These advantages are contrasted by the inability to uniquely determine the posture of the arm and/or the torques at the human joints knowing the robot posture: in fact, the interaction between robot and human occurs through only one point of contact.

Then, a real transition from EEBs to exoskeletons occurred. Upper limb exoskeletons are mechanisms with kinematics isomorphous to those of the arm, with the axes of the mechanical joints aligned with those of the human body joints.

They are therefore substantially a mechanical structure parallel to the arm. This feature allows exoskeletal devices to have multiple connection points (interfaces) between human and robot: the greater number of interfaces allows to accurately determine the posture of the human limb based on the posture of the robotic one. The same applies to the torques at the human joints, which can be determined and monitored individually, one by one. By means of mechanical stops at the joints, unwanted phenomena such as elbow hyperextension can be avoided. It is often possible to cover a large part of the working space reachable by the human arm with an exoskeleton, simply because the exoskeleton has kinematics similar to those of the upper limb: however, this involves the need to adjust the link lengths to the arm segment lengths.

The most important aspects to consider when designing an exoskeleton for the upper limb include the following:

The shoulder center of rotation is not fixed: the shoulder center of rotation moves during flexion and extension movements and abduction and adduction movements. If the exoskeleton is also attached to the body on the forearm, the movement of the center of rotation must be considered in order to eliminate errors due to the misalignment between the robotic joint axes and the shoulder axes.

The singular configuration of the robotic shoulder joint should not be inside the robot workspace, or at most should be at the borders thereof.

Centering the robotic shoulder joint axes on the human shoulder center of rotation, which is inside the body, is an operation which in any case cannot be carried out with accuracy and precision, and which must be repeated for each patient.

The inertia of the moving parts should be low in order to have excellent mechanical transparency.

With rehabilitation robots, it should be generally ensured that the mechanism is retro-guidable.

The safety of the device is essential.

In [1] the problem of joint misalignment is discussed, i.e., the difficulty of obtaining the axes of the active robotic joints correctly aligned with those of the human body joints.

This phenomenon may cause unwanted arm movements and may simultaneously cause unwanted stresses on the human body, due to the hyperstatic properties of the human plus robot system. In fact, in the event of misalignment, if the two kinematic chains were both rigid, movement would be totally prevented; in reality the misalignment is recovered through deformations. The major deformations in the human plus robot system occur at the interface between human and robot given the low stiffness of skin, fat cells and muscle structure compared to the exoskeleton materials. That is why in the event of joint misalignment, unwanted stresses are put on the human exoskeleton interfaces.

In order to obviate to this problem, among the methods already used, it is possible to 1) insert elasticity and compliance within the exoskeleton, or 2) add redundant passive joints in the kinematic chain, or 3) use links of adjustable length or other alignment correction mechanisms, or still 4) use interfaces between exoskeleton and human with passive joints, in order to avoid unwanted stresses.

Due to the load transfer between robot and human as the interface surface area changes, it is clear that slightly extended interfaces can be uncomfortable if the interface transmits torque, therefore use of the widest possible interfaces or at most the use of pairs of interfaces is recommended.

For this reason, in recent years soft wearable robotic devices have been introduced, i.e. characterized by flexible links, or entirely made of light, flexible materials such as fabrics of textile fibers or typical fibers of composite materials. One of the first soft robotics works for assisting arms was obtained by Kobayashi and Hiramatsu, at the University of Tokyo [1].

This system substantially consists of a fabric suit, which is a sort of second skin for the torso and arms. McKibben-type pneumatic actuators are attached to this suit which function substantially like the muscles of the human body, i.e., they can contract to decrease the distance between two points of the suit.

Conor Walsh of Harvard University subsequently worked on soft wearable devices with pneumatic actuation. The basic concept is the same as the muscle suit of the University of Tokyo, that is, using air chambers as an external muscular system. As for the upper limb, Prof. Walsh substantially produced two devices, one for the hand and one for the shoulder [2-3].

Lorenzo Masia et al., at NTU University in Singapore, have developed an exosuit (soft wearable exoskeleton) for elbows [4, CN107921628] consisting of two fabric interfaces which are closable around the arm with Velcro straps. One of the interfaces is placed on the forearm and one on the arm. Two cables are interposed between these two interfaces, which act as the two antagonist muscles, the biceps and triceps. The cables are fixed between the two interfaces and guided by a motor positioned inside a rear backpack, with a Bowden cable transmission (sheathed cable).

At the state of the art there are numerous exoskeletal devices.

Most solutions provided in literature refer to solutions using rigid exoskeletal structures for the transmission of forces and movement.

In U.S. 2019160653 a parallel kinematic system is described for the actuation of the shoulder joint through a mechanism actuated with 3 linear actuators, while in WO2018093448 a kinematic mechanism with remote center of rotation and rigid-link spherical kinematics is described.

Some of these systems are dedicated to supporting the lower limb and use pneumatic actuation (U.S. 2019029914) or systems of bands adapted to transfer tension up (CN108670195, U.S. 2018008502). The same concepts are applied through the use of Bowden cables in CN107921628, where a solution adapted to transfer an assistance torque to the elbow is provided.

In CN109318217A a Bowden cable actuation system is patented for the actuation of the flexion/extension or abduction/adduction joint of the shoulder joint, through the use of an actual pulley mounted on a rotoidal pair with vertical inclination. Such a system does not allow full movements of the shoulder joint.

In WO2019081851 an articulated, soft parallelogram mechanism is described which allows to position an axis actuated in alignment with a degree of freedom of the wearer's shoulder.

Instead, in ITUA20164364A1, a system for transferring a rotary motion between two arbitrary pulleys arranged on axes in space with arbitrary spatial orientation is provided.

Some mechanisms for transmission by shoulder exoskeleton are described in the following bibliographical references:

[1] H. Kobayashi, K. Hiramatsu, Development of muscle suit for upper limb. Proceedings of the IEEE International Conference on Robotics & Automation, 2004.

[2] P. Polygerinos, Z. Wang, K. C. Galloway, R. J. Wood, C. J. Walsh, Soft robotic glove for combined assistance and at-home rehabilitation. Robotics and Autonomous Systems, 2015, No. 73, 135-143

[3] C. T. O'Neill, N. S. Phipps, L. Cappello, S. Paganoni, C. J. Walsh, A soft wearable robot for the shoulder: design, characterization, and preliminary testing . International Conference on Rehabilitation Robotics, 2017

[4] Y. G. Kim, M. Xyloiannis, D. Accoto, L. Masia, Development of a soft exosuit for industrial application. 7th International Conference on Biomedical Robotics and Biomechatronics (BioRob), 2018.

The aforesaid known mechanisms for exoskeletons therefore do not allow to compensate for the movement of the shoulder center of rotation and recover misalignments.

SUMMARY OF THE INVENTION

It is an object of the present invention to devise and provide an underactuated mechanism which allows to meet the aforesaid requirements and to at least partially overcome the drawbacks mentioned above with reference to the background art.

In particular, it is an object of the present invention to provide an underactuated mechanism for a robotic shoulder exoskeleton adapted to transfer the flexion-extension reaction force generated during the actuation of the shoulder joint through an actuator positioned at the level of the flexion extension shoulder joint in any configuration and orientation of the arm, through a flexible and kinematically hyper-redundant system capable of overcoming the abduction-adduction degrees of freedom of internal-external rotation and transferring the action on the torso of the person wearing the system, thus allowing the human to have greater freedom of movement on these degrees of freedom.

It is another object of the present invention to provide an underactuated mechanism for a robotic shoulder exoskeleton capable of bypassing the degrees of freedom of adduction-abduction and internal/external rotation of the shoulder and transferring the reaction required to balance the actuation torque at the level of the torso, thus allowing to implement an underactuated shoulder exoskeleton system.

It is another object of the present invention to provide an underactuated mechanism for a shoulder exoskeleton capable of correctly and automatically adapting the alignment of the axes of the active robotic joints with those of the human body joints.

These and further objects and advantages are achieved by an underactuated mechanism for shoulder exoskeleton, as well as by a shoulder exoskeleton comprising said underactuated mechanism, in accordance with the independent claims.

Further objects, solutions and advantages are found in the embodiments described below and claimed in the dependent claims.

In particular, the present underactuated mechanism allows, due to the kinematic structure thereof characterized by a proximal passive rotoidal joint and a distal active rotoidal joint, connected via a hyper-redundant mechanism, to create an exoskeleton for upper limbs which does not limit the human freedom of movement, because it has sufficient degrees of freedom for all the movements related to the shoulder joint, corresponding to a total of 3 independent degrees of freedom. The greater number of degrees of freedom of the aforesaid hyper-redundant mechanism connecting the two rotoidal joints also allows to have greater freedom of reconfiguration of the entire underactuated mechanism forming the exoskeleton, which therefore has the ability to self-align and compensate for the movements of the shoulder center of rotation and any assembly errors. Such an underactuated mechanism further has the peculiarity of always keeping the distal rotoidal joint always aligned with the flexion-extension axis of the shoulder, thus allowing to always assist the lifting of the arm with a single motor or actuation system. Finally, the particular kinematic structure of the aforesaid underactuated mechanism allows the reaction torque to be transmitted backwards, as there are no movement constraints between the rotation of the distal rotoidal joint and the hyper-redundant connection mechanism and the proximal rotoidal joint.

BRIEF DESCRIPTION OF THE DRAWINGS

The invention will be illustrated below with the description of some embodiments thereof, given by way of non-limiting example, with reference to the accompanying drawings, in which.

DESCRIPTION OF THE PREFERRED EMBODIMENTS

Figure 1:
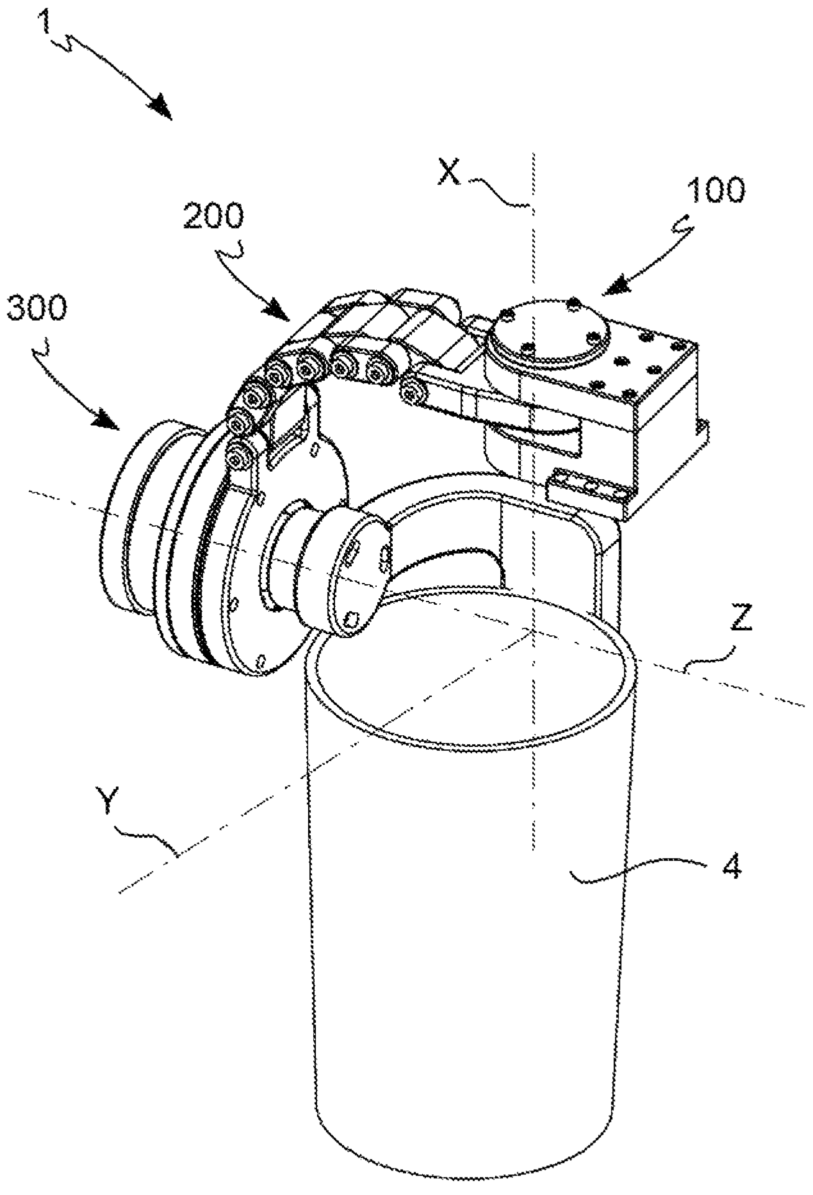
FIG. 1 shows an isometric view of an underactuated mechanism according to the invention, which shows the three main modules which form the invention, i.e., the rotary mechanism which, once actuated, can transfer the flexion-extension torque action, the flexible element used for the torque transmission, the rotary mechanism integral with the person's torso.
Figure 2A:
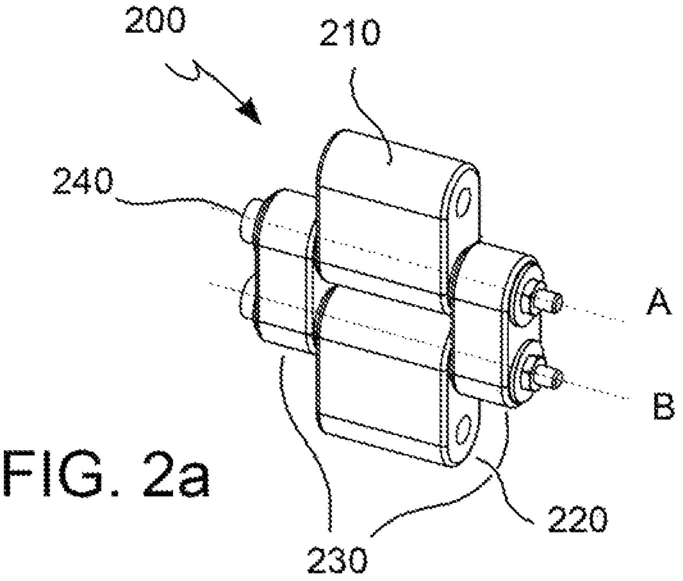
FIGS. 2*a* and 2*b* show a detail of the implementation of the transmission system, or hyper-redundant connection mechanism for transferring torque in the exemplary case of two members and four members, respectively.
Figure 2B:
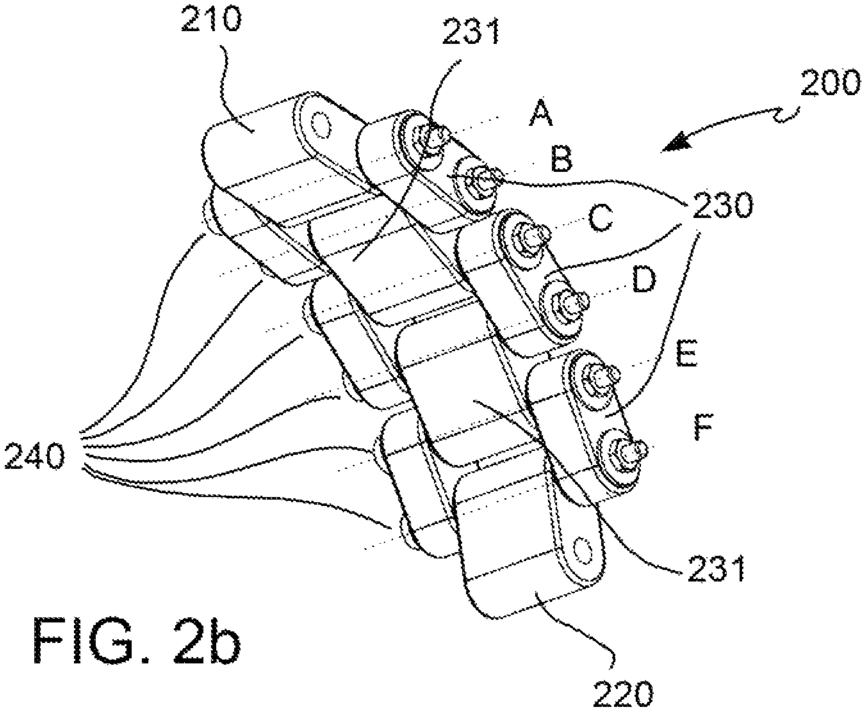
Figure 3:
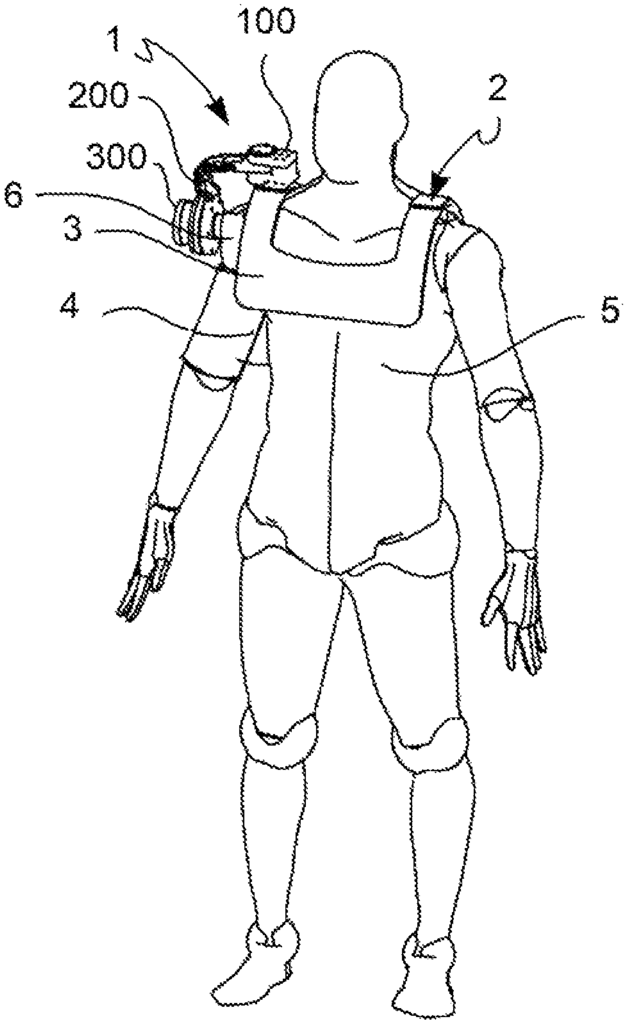
FIG. 3 and FIG. 4 show two possible configurations of the shoulder exoskeleton comprising the underactuated mechanism of FIG. 1.
Figure 4:
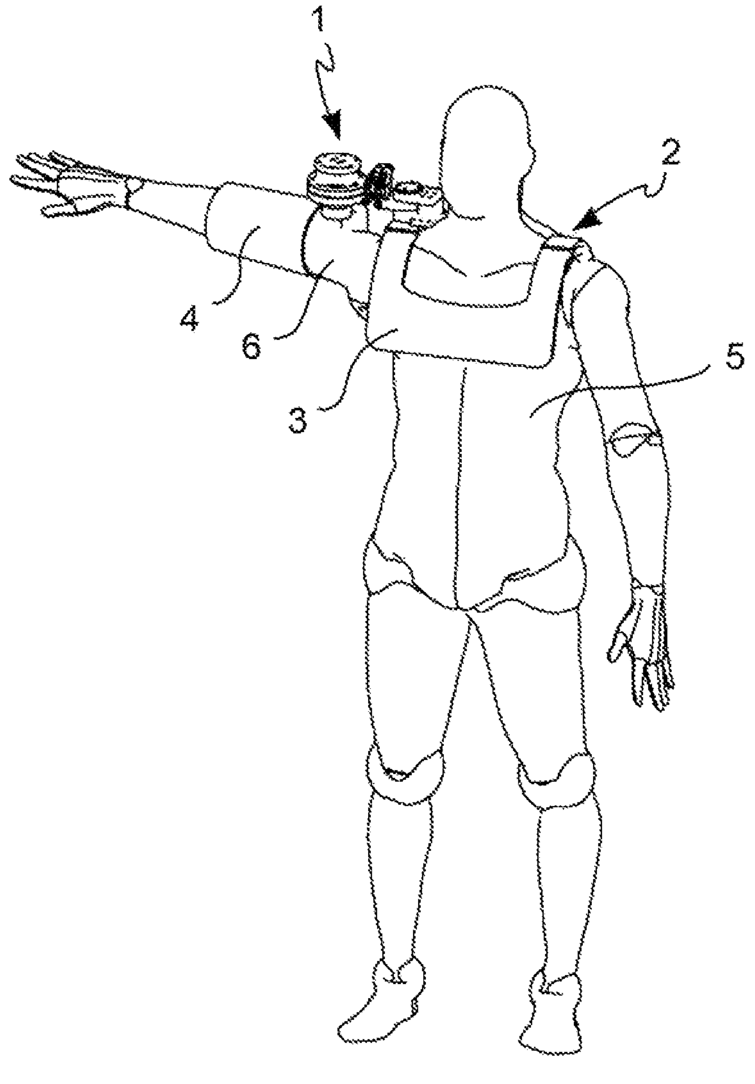

With reference to the figures, an underactuated mechanism according to the invention, in particular for a robotic exoskeleton, is generally indicated with reference number 1.

The underactuated mechanism 1, which allows the actuation of a distal degree of freedom of the shoulder joint and the transfer of the torques and reaction force generated by the actuation system on a frame 3, or torso attachment device, integral with the torso, through a hyper-redundant kinematic mechanism 200, is formed as follows:

a. a first non-actuated rotoidal joint 100 connected, or adapted to be connected, to the human torso 5, which rotates about the axis X, b. a connection mechanism 200 connected to the first rotoidal, or rotational, joint 100, c. a second rotoidal, or rotational, joint 300 which (i) rotates about the axis Y arranged, or adapted to be arranged, according to the degree of shoulder joint flexion-extension, which is coplanar with the axis Y, (ii) is remotely actuated by a driven pulley and Bowden cables or by a direct drive actuation system with a co-located motor, (iii) is fastened to the connection mechanism 200 on one side and to the human arm 6 on the other side, with the connection mechanism 200 consisting of at least three or more members 210, 220, 231, two of which 210, 220 rigidly fastened to one of the rotation joints 100, 300, respectively, all with parallel joints, referred to as minimum joints A and B, arranged so as to connect one member with the next one to form a rotation constraint about the axis of said parallel joints.

In other words, the underactuated mechanism 1 comprises:

a. a first rotoidal joint 100, adapted to be connected to the human torso 5, said first rotoidal joint 100 defining a first joint rotation axis X;

b. a hyper-redundant connection mechanism 200 connected to the first rotoidal joint 100 at a first end of said hyper-redundant connection mechanism 200, c. a second rotoidal joint 300 adapted to be connected to the human arm 6, said second rotoidal joint 300 defining a second joint rotation axis Y adapted to be arranged according to the degree of flexion-extension of the human shoulder joint, said second rotoidal joint 300 being connected to said hyper-redundant connection mechanism 200 at a second end of said hyper-redundant connection mechanism 200;

wherein said underactuated mechanism 1 is configured to transfer back torque and reaction forces from the second rotoidal joint 300 to the first rotoidal joint 100, and wherein:

- the first joint rotation axis X is coplanar with the second joint rotation axis Y;
- the first rotoidal joint 100 is not actuated;
- the second rotoidal joint 300 is actuated in a manner selected from: remotely by a driven pulley and Bowden cables, or by a direct drive actuation system with co-located motor;
- the hyper-redundant connection mechanism 200 comprises at least three members 210, 220, 231 connected together by means of rotation joints with axes parallel to one another A, B, . . . F, wherein a member 210, 220 of said at least three members is fastened to the first rotoidal joint 100 and another member of said at least three members 210 220 is fastened to the second rotoidal joint 300.

Thereby, the hyper-redundant connection mechanism 200 allows the passive rotation of the shoulder about the axis X perpendicular to the axes Y and Z, and capable of transmitting the constraining reaction torques perpendicular to the axis X and the constraining reaction forces along the axis X, without any relative rotation between the members forming the chain.

Furthermore, the connection mechanism is capable of varying the distance between the first rotoidal joint 100 and the second rotoidal joint 300, through a reconfiguration of the relative rotation between adjacent members.

According to one embodiment, only the second rotoidal joint 300 is actuated.

Direct drive actuation system with co-located motor means that the motor is integrated in the second rotoidal joint 300, or that the second rotoidal joint 300 is mounted directly on the output shaft of the motor.

In accordance with an embodiment, the underactuated mechanism 1 for shoulder exoskeleton lacks a forward kinematic transmission of rotation motion from said first rotoidal joint 100 to said second rotoidal joint 300.

That is, a rotation of the second rotoidal joint 300 about the second joint axis does not influence a rotation of the first rotoidal joint 100 about the first joint axis.

According to such an embodiment, the underactuated mechanism 1 transmits only a constraining reaction backwards from the second rotoidal joint 300 to the first rotoidal joint 100.

Within the scope of the present invention, it is assumed that an underactuated system is present, where the multi-degree of freedom mechanism has only the last degree of freedom actuated: moreover, a torque transfer between two axes is not required, since it is considered that the distal axis is provided with its own actuation through either a remote actuation system via Bowden or pneumatic cables, or on site (direct drive) by an actuator positioned on the joint.

"Underactuated" means a mechanism which has a lower number of degrees of freedom actuated with respect to the total number of degrees of freedom.

In other words, the mechanism 1 is underactuated since, between the first rotoidal joint 100 and the second rotoidal joint 300, one of the two is not actuated, in particular the first rotoidal joint is not actuated.

"Non-actuated rotoidal joint" means a system consisting of two bodies which can freely rotate with respect to each other along a certain axis, not provided with a rotary motor or other system capable of exerting an arbitrary value torque between the two parts, while "actuated rotoidal joint" means a system consisting of two bodies which can freely rotate with respect to each other along a certain axis, provided with a rotary motor or other actuation system capable of exerting an arbitrary value torque between the two sides.

"Hyper-redundant connection mechanism" means a serial mechanism with an overall number of degrees of freedom which is much greater than the number of degrees of freedom of the rigid end body of the mechanism.

"Serial mechanism" means a mechanism consisting of rigid bodies connected in series. Between two rigid bodies there is at least one joint allowing relative movement between the two bodies with at least one degree of freedom.

"Robotic shoulder exoskeleton" means a wearable mechanism, outside the human skeleton, which follows the kinematic structure thereof, and connected in one or more points to a human.

The first non-actuated rotoidal joint 100 is preferably arranged closer to the human torso than the second rotoidal joint 300.

For this reason, the first non-actuated rotoidal joint 100 can be defined proximal rotoidal joint, and the second actuated rotoidal joint 300 can be defined distal rotoidal joint.

Preferably, said one member of said at least three members 210 is arranged at a first end of said hyper-redundant connection mechanism 200, and in which said other of said at least three members 210 is arranged at a second opposite end of said hyper-redundant connection mechanism 200.

In accordance with an embodiment, the hyper-redundant connection mechanism 200 forms a chain of rigid bodies consisting of at least three different members 210, or rigid elements, connected together by means of coplanar rotoidal couplings along axes A,B,D . . . F . . . through rigid shafts 240 and spacers 230

In accordance with an embodiment, said at least three members 210 are rigid elements connected together in sequence, or together in series, to form a chain.

In accordance with an embodiment, each member of said at least three members 210 is connected to a subsequent member by means of two opposite connection spacer elements 230 of elongated shape and parallel to each other, each of said connection spacer elements 230 being rotatably engaged with said each member 210 and with said subsequent member about two of said parallel axes of said rotation joints, respectively.

In accordance with an embodiment, the underactuated mechanism 1 comprises elastic equilibrium means allowing the second rotoidal joint 300 to reach an equilibrium position with respect to the first rotoidal joint 100 determined by the minimum value of the elastic and gravitational potential.

For example, said elastic equilibrium means comprise elastic elements connected to at least two of said at least three members 210, or connected to said first rotoidal joint 100 and/or to said second rotoidal joint 300, and/or to at least one of said at least three members 210.

For example, said elastic equilibrium means comprise a metal foil or other elastic material, for example carbon fiber, which has a preferential elasticity in one plane and a high stiffness in the other two directions.

In other words, it is further possible to provide the system with an intrinsic elasticity through a system of elastic elements, which allows the chain to reach an equilibrium position determined by the minimum value of the elastic and gravitational potential.

In an alternative embodiment, the same constraint can be obtained through a metal foil or other material, for example carbon fiber, which has a preferential elasticity in one plane and a high stiffness in the other two directions.

In other words, the hyper-redundant connection device 200 can be provided with a distributed intrinsic elasticity system in order to achieve an equilibrium configuration, in the absence of external forces except for the weight thereof.

According to another aspect of the invention, the aforementioned objects and advantages are achieved by a robotic shoulder exoskeleton 2 comprising an underactuated mechanism 1 according to the features described above.

In particular, the exoskeleton can comprise a first torso attachment device 3 connected to said first non-actuated rotoidal joint 100, configured for fastening the underactuated mechanism 1 to the human torso 5, and an opposite second arm attachment device 4 connected to said second rotoidal joint 300, configured for fastening the underactuated mechanism 1 to the human arm 6.

The shoulder exoskeleton described above is capable of independently compensating for any misalignments between the human body joints and the exoskeleton joints by virtue of the hyper-redundant kinematic mechanism 200.

The shoulder exoskeleton described above, having the most distal rotational degree of freedom actuated, is capable of giving the wearer an assistance torque.

Although the underactuated mechanism 1 described above has been shown as applicable to a shoulder joint of the upper limb, it can similarly be applied to a knee joint of the lower limb, without substantial modifications.

Similarly, although a robotic shoulder exoskeleton of the upper limb has been described, such an exoskeleton can be a robotic knee exoskeleton of the lower limb, without substantial modifications.

Those skilled in the art may make modifications and adaptations to the embodiments of the device described above, or replace elements with others which are functionally equivalent, in order to meet contingent needs, without departing from the scope of the following claims. Each of the features described as belonging to a possible embodiment may be implemented irrespective of the other embodiments described.

What is claimed:

1. A underactuated mechanism comprising:

a first rotational joint, adapted to be connected to a human torso, said first rotational joint defining a first joint rotation axis (X);

a hyper-redundant connection mechanism connected to the first rotational joint at a first end of said hyper-redundant connection mechanism;

a second rotational joint adapted to be connected to a human arm, said second rotational joint defining a second joint rotation axis (Z) adapted to be arranged according to the degree of flexion-extension of a human shoulder joint, said second rotational joint being connected to said hyper-redundant connection mechanism at a second end of said hyper-redundant connection mechanism; and elastic equilibrium means that allow the second rotational joint to reach an equilibrium position with respect to the first rotational joint determined by a minimum value of elastic and gravitational potential, wherein said underactuated mechanism is configured to transfer back torque and reaction forces from the second rotational joint to the first rotational joint, and wherein:

the first joint rotation axis (X) is coplanar with the second joint rotation axis (Z), said first rotational joint is not actuated, said second rotational joint is actuated by a direct drive actuation system with co-located motor, and said hyper-redundant connection mechanism comprises at least three members connected together by rotation joints with axes parallel to one another, wherein one member of said at least three members is fastened to said first rotational joint and another member of said at least three members is fastened to said second rotational joint.

2. The underactuated mechanism of claim 1, wherein only the second rotational joint is actuated.

3. The underactuated mechanism of claim 1, wherein the co-located motor is integrated in the second rotational joint.

4. The underactuated mechanism of claim 1, wherein the underactuated mechanism is devoid of a forward kinematic transmission of rotation motion from said first non-actuated rotational joint to said second rotational joint.

5. The underactuated mechanism of claim 4, wherein the underactuated mechanism is configured to transmit only a constraining reaction backwards from the second rotational joint to the first non-actuated rotational joint.

6. The underactuated mechanism of claim 1, wherein the first non-actuated rotational joint is arranged closer to the human torso with respect to the second rotational joint.

7. The underactuated mechanism of claim 1, wherein one member of said at least three members is arranged at a first end of said hyper-redundant connection mechanism, and wherein another member of said at least three members is arranged at a second opposite end of said hyper-redundant connection mechanism.

8. The underactuated mechanism of claim 1, wherein the hyper-redundant connection mechanism forms a chain of rigid bodies comprises at least three different members of said at least three members, which are connected together by coplanar rotational couplings through rigid shafts and spacers.

9. The underactuated mechanism of claim 1, wherein said at least three members are connected together in sequence, or together in series, to form a chain.

10. The underactuated mechanism of claim 1, wherein each member of said at least three members is connected to a successive member by two opposite spacers of elongated shape and parallel to each other, each spacer being rotatably engaged with said each member of said at least three members and said successive member about two parallel axes of said parallel rotation joints, respectively.

11. The underactuated mechanism of claim 1, wherein said elastic equilibrium means comprise elastic elements connected to at least one of the following: at least one of said at least three members, at least two of said at least three members, said first non-actuated rotational joint, or said second rotational joint.

12. The underactuated mechanism of claim 1, wherein said elastic equilibrium means comprise a metal foil or other elastic material having a preferential elasticity in one plane and a high stiffness in other two directions.

13. The underactuated mechanism of claim 1, wherein the hyper-redundant connection device is provided with a distributed intrinsic elasticity system to achieve an equilibrium configuration, in the absence of external forces except for weight thereof.

14. A robotic shoulder exoskeleton comprising an underactuated mechanism allowing a distal degree of freedom of a human shoulder joint and transfer of reaction moments and force generated by an actuation system on a first torso attachment device adapted to be fastened to a human torso, through a hyper-redundant kinematic mechanism, said underactuated mechanism comprising:

a first non-actuated rotational joint adapted to be connected to the human torso, which rotates about a first joint rotation axis (X);

a hyper-redundant connection mechanism connected to the first non-actuated rotational joint;

a second rotational joint, wherein the second rotational joint rotates about a second joint rotation axis (Z) adapted to be arranged according to a degree of flexion-extension of the human shoulder joint, said second joint rotation axis (Z) being coplanar with the first joint rotation axis the second rotational joint being remotely actuated by a direct drive actuation system with co-located motor, and wherein the second rotational joint is fixed to the hyper-redundant connection mechanism on one side and adapted to be fastened to a human arm on the other side; and elastic equilibrium means which allow the second rotational joint to reach an equilibrium position with respect to the first non-actuated rotational joint determined by a minimum value of elastic and gravitational potential, said hyper-redundant connection mechanism comprising at least three members, two members of said at least three members being rigidly fastened to one of the rotational joints, respectively, and all members being connected together by parallel rotation joints arranged so as to connect one member to a successive member to form a rotation constraint about an axis of said parallel rotation joints.

15. The robotic shoulder exoskeleton of claim 14, further comprising:

a first torso attachment device connected to said first non-actuated rotational joint and configured to fasten the underactuated mechanism to the human torso; and an opposite second arm attachment device connected to said second rotational joint and configured to fasten the underactuated mechanism to the human arm.

* * * * *